Figure 2:
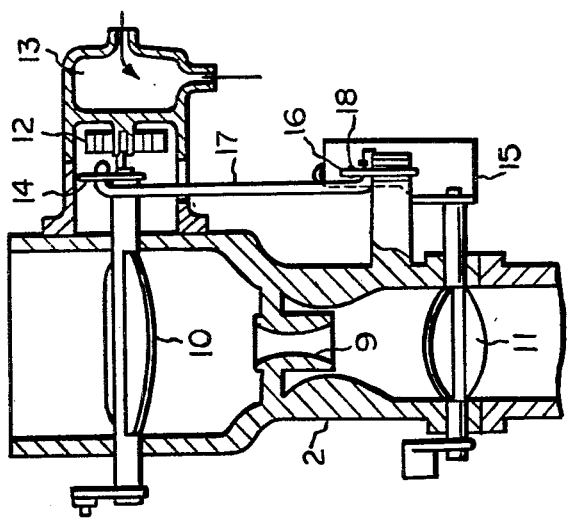

United States Patent [19]

Sugiyama

[11] 4,194,477
[45] Mar. 25, 1980

[54] DEVICE FOR ADMISSION OF SECONDARY AIR TO INTERNAL COMBUSTION ENGINE INTAKE

[75] Inventor: Keiichi Sugiyama, Shizuoka, Japan

[73] Assignee: Yamaha Hatsudoki Kabushiki Kaisha, Iwata, Japan

[21] Appl. No.: 890,678

[22] Filed: Mar. 27, 1978

[30] Foreign Application Priority Data

Apr. 14, 1977 [JP] Japan .................................. 52-45773

[51] Int. Cl.² .......................................... F02M 23/04
[52] U.S. Cl. .............................. 123/124 R; 123/97 B; 123/103 R; 123/119 D; 137/480; 261/DIG. 19
[58] Field of Search ....... 123/119 D, 119 DB, 124 R, 123/124 A, 124 B, 97 B, 103 R; 261/DIG. 19, 34 B, 39 B; 137/480

[56] References Cited

U.S. PATENT DOCUMENTS

| | | | |
|---|---|---|---|
| 2,681,213 | 6/1954 | Gordon | 123/127 |
| 2,722,207 | 11/1955 | Sarto | 123/127 |
| 4,098,241 | 7/1978 | Tateno et al. | 123/124 A |
| 4,106,464 | 8/1978 | Yamashita et al. | 123/124 A |

*Primary Examiner*—Wendell E. Burns
*Attorney, Agent, or Firm*—Donald D. Mon

[57] ABSTRACT

A system for admitting secondary air to an engine intake manifold at the time of abrupt engine deceleration to avoid air/fuel mixtures which are momentarily too rich. The system is disabled from admitting secondary air when the engine is starting cold, and when its speed is slowly reduced.

3 Claims, 2 Drawing Figures

DEVICE FOR ADMISSION OF SECONDARY AIR TO INTERNAL COMBUSTION ENGINE INTAKE

This invention relates to an improved secondary air admission device of an engine which is used to admit secondary air into the suction passage when the throttle valve is closed rapidly.

When a throttle valve is closed rapidly during the operation of an engine, the negative pressure (suction) in the suction passage between the throttle valve and the combustion chamber increases with the result that the richness of the air/fuel mixture also increases. This is because of an abrupt evaporation of the fuel which has been deposited as a film on the wall of the suction passage. Then in case of misfire, polluting substances will be discharged. To prevent this difficulty, it has been the practice to use a control valve which opens the suction passage to the atmosphere when the negative pressure (suction) in the suction passage increases rapidly, thus admitting secondary air into the suction passage to dilute the air/fuel mixture and compensate for the abrupt increase in fuel.

Heretofore a control valve has been used for the prior art secondary air admission device in which the valve is opened by evacuating a diaphragm chamber with a negative pressure from the suction passage between the throttle valve and the combustion chamber, thereby opening the suction chamber to the atmosphere. For this reason, when the throttle valve is closed where dilution of the air/fuel mixture is not desirable (as at the time of cold starting) the admitted secondary air decreases the concentration of the air/fuel mixture thus resulting in unsmooth running. As above described, said device is required to operate only when the speed is decreased rapidly during normal running, and admission of the secondary air at the time of slow reduction of speed increases the air/fuel ratio. The prior art device is therefore not satisfactory because, even when the speed is decreased slowly, increase in the negative pressure in the suction passage automatically admits the secondary air.

This invention contemplates the elimination of the above disadvantages. According to this invention there is provided a secondary air admission device for an engine, in which a second diaphragm chamber is provided for the control valve, a suction port is provided near the throttle valve's position at the time of idle opening, and the suction port and the second diaphragm chamber are communication through a check valve thereby preventing admission of the secondary air at the times of cold starting, and of slow reduction of speed.

Figure 1:
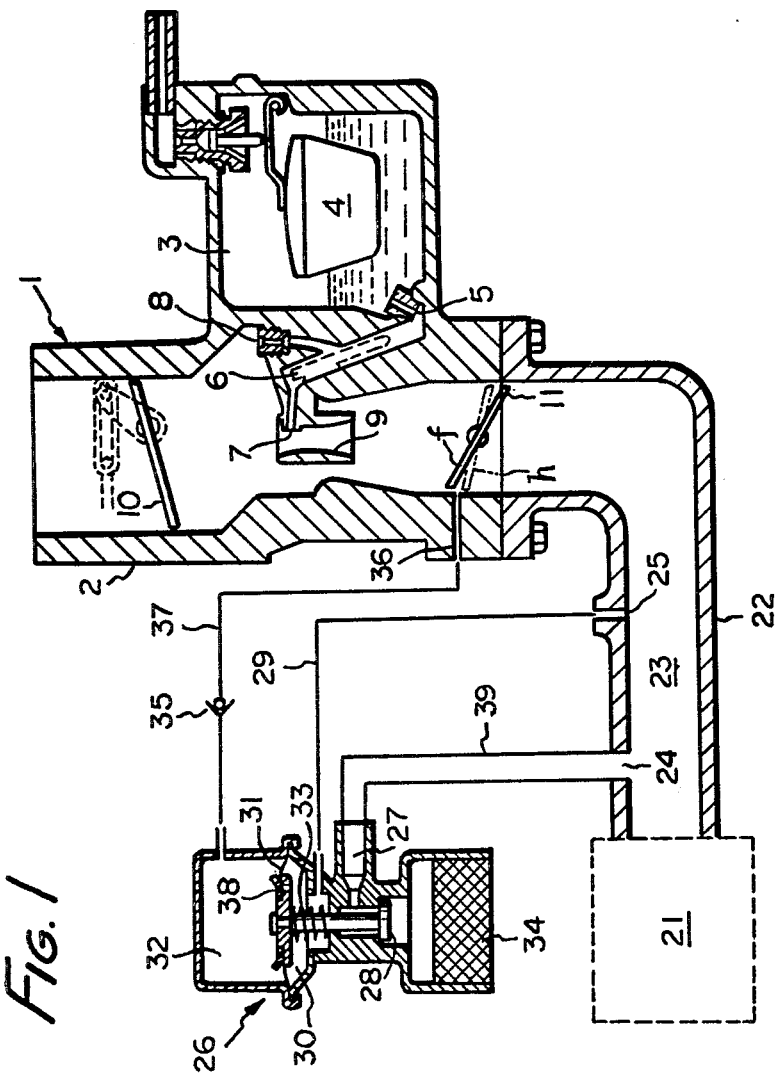

The above and other features of this invention will be fully understood from the following detailed description and the accompanying drawings, in which:

FIG. 1 is a longitudinal sectional view showing a secondary air admission device embodying the invention; and FIG. 2 shows a longitudinal section of an air suction drum which forms part of the of device in FIG. 1, taken at right angles to the plane of FIG. 1.

In the accompanying drawing, reference numeral 1 designates a carburetor, which is well-known and includes a suction drum 2, a float chamber 3 integral with the suction drum 2, a float 4, a main jet 5, a bleed pipe 6, a main nozzle 7, an air jet 8, an inner venturi 9, a choke valve 10 and a throttle valve 11. The carburetor 1 is further provided with a member for consituting an automatic choke device, i.e, a bimetal 12, an engine cooling water passage 13, a lever 14 secured to each valve shaft, a first idle cam 16, a rod 17 and a cam follower 18.

21 designates an engine, and 22 designates a suction pipe defining a suction passage 23 which interconnects the suction port of the engine 21 and said carburetor 1. The suction pipe 22 is provided with a suction port 24, to be communicated with the atmosphere through a control valve to be described later, and a vent port 25 communicated with the first diaphragm chamber. 26 shows a control valve for controlling the admission of the secondary air into the suction passage 23.

Control valve 26 is constituted by a secondary air admission passage 27, a valve member 28 for opening and closing passage 27, a first diaphragm chamber 30 connected to the vent port 25 through a vent passage 29, a diaphragm 31 for supporting the valve member 28, a second diaphragm chamber 32 formed above the first diaphragm chamber 30. The diaphragm 31 forms a partition wall between the diaphragm chambers. A compression spring 33 biases the diaphragm. An air filter 34 is provided on the atmospheric side of the secondary air admission passage 27. The second diaphragm chamber 32 of the control valve 20 is connected to the vent port 36. Vent port 36 opens in the suction drum 2 of the carburetor 1 via a check valve 35. The vent port 36 is provided such that it will be positioned on the downstream side of the throttle valve 11 at the time of fast idle opening, as shown by solid lines (f) and on the upstream side when the throttle is more nearly closed in the hot idle position as shown by dot and dash lines (h) in FIG. 1. More particularly, the vent port 36 is provided to oppose the periphery of the throttle valve 11 at an intermediate position between the fast idle opening position f of the throttle valve 11 shown by solid lines and the hot idle opening position h.

37 shows a vent passage communicating the vent port 36 with the second diaphragm chamber 32. 38 shows an orifice intercommunicating the first and second diaphragm chambers 30 and 32. 39 shows an air supply pipe connecting the secondary air admission passage 27 of the control valve to the suction passage 23.

With the construction described above, when the throttle valve 11 is quickly closed during normal running, then due to the negative pressure in the suction passage 23, the pressure in the first diaphragm chamber 30 becomes negative so that the valve member 29 is lowered to open the secondary air supply pipe 39. As a result, air is admitted through air supply pipe 39 and suction port 24 to dilute the air/fuel mixture. When such low speed condition persists the pressure in the first and second diaphragm chambers 30 and 32 balance with each other through the orifice 38 whereby the valve member 28 is reset after the passage of time to stop the admission of the secondary air thereby maintaining the air/fuel mixture at a predetermined ratio after the fuel layer has evaporated.

On the other hand, when the throttle valve 11 is closed slowly, the interval in which the periphery of the throttle valve 11 comes to oppose the vent port 36 immediately prior to the hot idle opening position h (shown by dot and dash lines) is longer than that when the throttle valve 11 is rapidly closed so that a high speed suction flow will be created between the periphery of the throttle valve 11 and the vent port 36 thus lowering the pressure therein. For this reason, the pressure in the second diaphragm chamber 32 becomes negative, and this negative pressure balances with the negative pressure in the first diaphragm chamber 30 so that the valve member 28 will not be opened Consequently unnecessary secondary air is not admitted into the suction passage 23.

When the throttle valve 11 is rapidly closed during cold starting, the periphery of the throttle valve 11 is positioned on the upstream side of the vent port 36 as shown by solid lines f, the diaphragm chambers 30 and 32 are subjected to the same suction force due to the negative pressure in the suction passage 23 so that the valve member 28 is not opened and the secondary air is not admitted into the suction passage 23.

As will be clear from the foregoing description, according to this invention by an extremely simple construction in which a second diaphragm chamber is provided for the conventional secondary air admission control valve, a vent port is opened in a suction bore of the suction passage, adjacent to the throttle valve, and the second diaphragm chamber is communicated with the vent port, it is possible to prevent admission of the secondary air into the suction passage at the times of cold starting and slow reduction of speed. As a consequence, it is possible smoothly to run the engine without accompanying engine stoppage at the time of the cold starting, and also obviate the defect of the prior art device wherein the predetermined air/fuel ratio is increased at the time of slow reduction of speed.

This invention is not to be limited by the embodiments shown in the drawings and described in the description which are given by way of example and not of limitation, but only in accordance with the scope of the appended claims.

I claim:

1. A secondary air admission device for an engine provided with a control valve for admitting secondary air into a suction passage downstream from a carburetor which includes a throttle valve in a bore downstream from said carburetor, characterized in that the control valve is constituted by a first diaphragm chamber communicated with the suction passage, a valve member opened and closed by the pressure variation in said first diaphragm chamber, and a second diaphragm chamber isolated from the first diaphragm chamber by a diaphragm which supports the valve member, a vent port is opened in said bore, said vent port being communicated with said second diaphragm chamber through a check valve, said vent port opening into said bore at an intermediate portion between the throttle valve position at the time of fast idle opening and the throttle valve position at the time of hot idle opening.

2. A secondary air admission device for providing secondary air to a suction passage downstream from a carburetor and which includes a pivotable throttle valve, said suction passage leading to a cylinder of an internal combustion engine, said device comprising: an off-on valve connecting on the one hand to the suction passage downstream from the throttle valve and on the other hand to the atmosphere, a first diaphragm chamber, a second diaphragm chamber, and a movable diaphragm forming a common partition between said two diaphragm chambers, said first diaphragm chamber being connected to the suction passage downstream from the throttle valve, and the second diaphragm chamber being connected to the suction passage between the positions occupied by the throttle valve in the cold idle position and in the hot idle position.

3. A secondary air admission device according to claim 2 in which a restricted orifice interconnects the first and second diaphragm chambers, and in which a unidirectional check valve is provided between the second diaphragm chamber and the suction passage which permits flow only toward the suction passage.

* * * * *